(12) United States Patent
Furukawa et al.

(10) Patent No.: US 12,438,204 B2
(45) Date of Patent: Oct. 7, 2025

(54) POWER STORAGE SYSTEM AND CONTROLLER FOR POWER STORAGE SYSTEM

(71) Applicant: Prime Planet Energy & Solutions, Inc., Tokyo (JP)

(72) Inventors: Kimihiko Furukawa, Kakogawa (JP); Yasuyuki Harada, Kakogawa (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 958 days.

(21) Appl. No.: 17/561,582

(22) Filed: Dec. 23, 2021

(65) Prior Publication Data

US 2022/0209319 A1    Jun. 30, 2022

(30) Foreign Application Priority Data

Dec. 25, 2020    (JP) ................ 2020-216507

(51) Int. Cl.
*H01M 10/44*    (2006.01)
*H01M 10/42*    (2006.01)

(52) U.S. Cl.
CPC ....... *H01M 10/441* (2013.01); *H01M 10/425* (2013.01); *H01M 2010/4271* (2013.01); *H01M 2220/20* (2013.01)

(58) Field of Classification Search
CPC ............. H02J 7/00309; H01M 10/441; H01M 10/427; H01M 2010/4271; H01M 2220/20
See application file for complete search history.

(56) References Cited

U.S. PATENT DOCUMENTS

| | | |
|---|---|---|
| 2004/0138785 A1 | 7/2004 | Emori et al. |
| 2008/0054909 A1 | 3/2008 | Fukuda |
| 2012/0166031 A1 | 6/2012 | Nishida |
| (Continued) | | |

FOREIGN PATENT DOCUMENTS

| | | |
|---|---|---|
| CN | 102474118 A | 5/2012 |
| JP | 2004215459 A | 7/2004 |
| (Continued) | | |

OTHER PUBLICATIONS

Machine translation of JP-2020198723-A. (Year: 2025).*

*Primary Examiner* — David V Henze-Gongola
(74) *Attorney, Agent, or Firm* — HAUPTMAN HAM, LLP

(57) ABSTRACT

There is provided a power storage system including a plurality of storage battery modules connected in parallel with a load. The power storage system includes: a resistance value calculating unit that calculates a resistance value of each storage battery module of the plurality of storage battery modules; a current value calculating unit that calculates a permissible current value of each storage battery module of the plurality of storage battery modules; and a determining unit that determines a maximum value of a current. The determining unit determines the maximum value such that a value of a current divided into each storage battery module of the plurality of storage battery modules does not exceed the permissible current value of each storage battery module of the plurality of storage battery modules based on a ratio of the resistance value of each storage battery module of the plurality of storage battery modules.

6 Claims, 4 Drawing Sheets

(56) References Cited

U.S. PATENT DOCUMENTS

| | | | |
|---|---|---|---|
| 2012/0175953 A1* | 7/2012 | Ohkawa | B60L 58/13 |
| | | | 307/18 |
| 2013/0154572 A1 | 6/2013 | Ito | |
| 2015/0108991 A1* | 4/2015 | Aoshima | G01R 31/374 |
| | | | 324/430 |
| 2015/0364797 A1* | 12/2015 | Inaba | H01M 10/0525 |
| | | | 429/61 |
| 2017/0141444 A1* | 5/2017 | Kawahara | G01R 31/392 |
| 2020/0176829 A1 | 6/2020 | Nishikawa et al. | |

FOREIGN PATENT DOCUMENTS

| | | | |
|---|---|---|---|
| JP | 2008-58260 A | | 3/2008 |
| JP | 2011205827 A | | 10/2011 |
| JP | 201250157 A | | 3/2012 |
| JP | 2016-118123 A | | 6/2016 |
| JP | 2017-85724 A | | 5/2017 |
| JP | 2018-096803 A | | 6/2018 |
| JP | 2020198723 A | * | 12/2020 |
| WO | 2014128941 A1 | | 8/2014 |
| WO | 2019049571 A1 | | 3/2019 |
| WO | 2020/246360 A1 | | 12/2020 |

* cited by examiner

POWER STORAGE SYSTEM AND CONTROLLER FOR POWER STORAGE SYSTEM

This nonprovisional application is based on Japanese Patent Application No. 2020-216507 filed on Dec. 25, 2020 with the Japan Patent Office, the entire contents of which are hereby incorporated by reference.

BACKGROUND OF THE INVENTION

Field of the Invention

The present disclosure relates to the technique of a power storage system and a controller for a power storage system.

Description of the Background Art

In recent years, demand for electric vehicles (EVs) and the like powered by electric power has been increasing. A power storage system used in an EV and the like is configured such that a plurality of power storage devices are connected in parallel in order to allow power supply for a long time.

Japanese Patent Laying-Open No. 2012-50157 discloses an example of a power storage system in which a plurality of power storage devices are connected in parallel. The power storage system described in Japanese Patent Laying-Open No. 2012-50157 includes an integrated controller that controls a current flowing through each power storage device of the plurality of power storage devices. The integrated controller obtains status information of each power storage device of the plurality of power storage devices, and controls the current flowing through each of the power storage devices based on the status information.

A permissible current value indicating a maximum value of the current that can be passed is set for each power storage device of the plurality of power storage devices. The integrated controller obtains the lowest permissible current value, of the permissible current values of the plurality of power storage devices, as a worst value. Based on the worst value, the integrated controller determines a value of a current to be passed through the entire circuit, such that a value of the current flowing through each power storage device of the plurality of power storage devices does not exceed the permissible current value. In this way, in the power storage system described in Japanese Patent Laying-Open No. 2012-50157, a situation in which the value of the current flowing through each power storage device of the plurality of power storage devices exceeds the permissible current value is prevented.

SUMMARY OF THE INVENTION

However, when the value of the current to be passed through the entire circuit is determined simply based on the worst value, the power storage system cannot exhibit the maximum capacity in some cases. That is, internal resistance values of a plurality of storage batteries may be different from each other. Therefore, even when the current is passed through the parallel circuit based on the worst value, the value of the current flowing through each power storage device of the plurality of power storage devices does not necessarily show an appropriate value due to current division.

An object of the present disclosure is to provide a power storage system that prevents a situation in which the power storage system cannot exhibit the maximum capacity, while preventing a value of a current flowing through each storage battery from exceeding a permissible current value.

A power storage system according to the present disclosure includes a plurality of storage battery modules connected in parallel with a load. The power storage system includes: a resistance value calculating unit that calculates a resistance value of each storage battery module of the plurality of storage battery modules; a current value calculating unit that calculates a permissible current value of each storage battery module of the plurality of storage battery modules; and a determining unit that determines a maximum value of a current to be passed through the load, based on the permissible current value calculated by the current value calculating unit.

The determining unit determines the maximum value such that a value of a current divided into each storage battery module of the plurality of storage battery modules does not exceed the permissible current value of each storage battery module of the plurality of storage battery modules based on a ratio of the resistance value of each storage battery module of the plurality of storage battery modules obtained by the resistance value calculating unit.

The foregoing and other objects, features, aspects and advantages of the present disclosure will become more apparent from the following detailed description of the present invention when taken in conjunction with the accompanying drawings.

DESCRIPTION OF THE PREFERRED EMBODIMENTS

Figure 1:
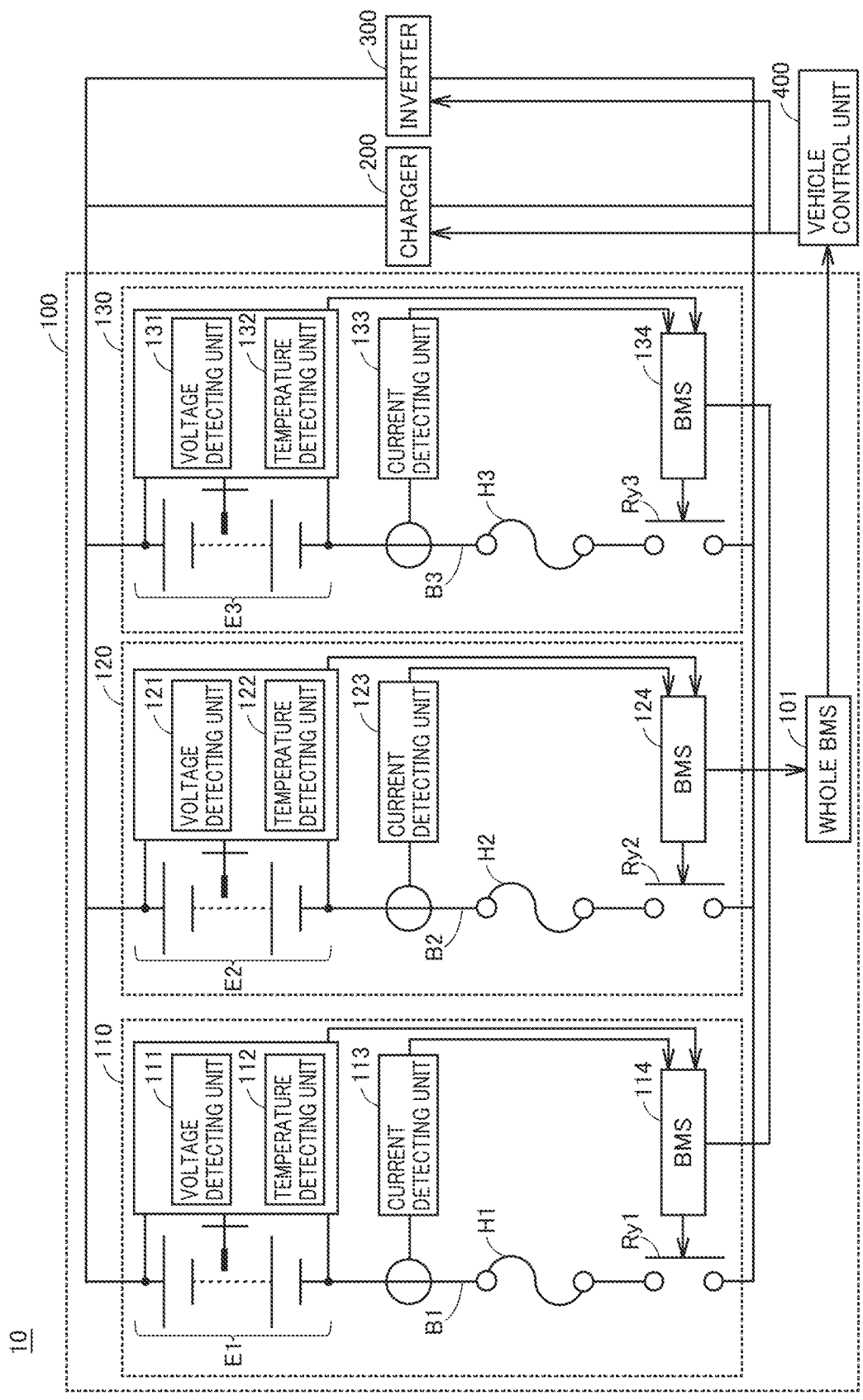
FIG. 1 shows a mounting example of a power storage system.

An embodiment of the present disclosure will be described in detail hereinafter with reference to the drawings, in which the same or corresponding portions are denoted by the same reference characters and description thereof will not be repeated.

First Embodiment

FIG. 1 shows a mounting example of a power storage system 100. Power storage system 100 is mounted on a vehicle 10. Vehicle 10 is a vehicle such as a hybrid vehicle or an electric vehicle, which is powered by a high-capacity battery. Vehicle 10 includes power storage system 100, a charger 200, an inverter 300, and a vehicle control unit 400.

Power storage system 100, charger 200 and inverter 300 are connected in parallel in the same circuit. Inverter 300 converts a DC current supplied from power storage system 100 into an AC current and supplies the AC current to a not-shown motor as electric power. Charger 200 supplies electric power to power storage system 100 and charges power storage system 100 that is a secondary battery.

Vehicle control unit 400 is connected to power storage system 100, charger 200 and inverter 300. Vehicle control unit 400 receives, from power storage system 100, a value of a current that can be passed through the entire circuit, i.e., a permissible current value of the entire circuit. Based on the permissible current value of the entire circuit received from power storage system 100, vehicle control unit 400 controls charger 200 or inverter 300.

Power storage system 100 according to the present embodiment includes a storage battery module 110, a storage battery module 120, a storage battery module 130, and a whole battery management system (BMS) 101. Storage battery module 110, storage battery module 120 and storage battery module 130 are connected in parallel. Hereinafter, each of storage battery module 110, storage battery module 120 and storage battery module 130 may be referred to as each of storage battery modules 110 to 130. The number of storage battery modules included in power storage system 100 is not limited to three.

Whole BMS 101 controls each of storage battery modules 110 to 130. Whole BMS 101 is a computing entity that executes various programs. Whole BMS 101 is implemented by, for example, a central processing unit (CPU), a field-programmable gate array (FPGA), a graphics processing unit (GPU) and the like.

Whole BMS 101 includes a not-shown memory. The memory provides a storage area that temporarily stores a program code, a working memory and the like when whole BMS 101 executes an arbitrary program. The memory is implemented by, for example, a volatile memory device (RAM) such as a dynamic random access memory (DRAM) or a static random access memory (SRAM).

Whole BMS 101 includes a storage device such as a not-shown ROM. The storage device such as a ROM provides a storage area that stores various types of data required for a computing process and the like. The storage device such as a ROM is implemented by, for example, a non-volatile memory device such as a hard disk or a solid state drive (SSD).

Whole BMS 101 receives a resistance value and a permissible current value of each of storage battery modules 110 to 130 from each of storage battery modules 110 to 130. The resistance value is a value indicating an electric resistance of each of storage battery modules 110 to 130, and the permissible current value is a value indicating a maximum value of a current that can be passed through each of storage battery modules 110 to 130.

In power storage system 100, when a current having a value higher than the permissible current value is passed through each of storage battery modules 110 to 130, each of storage battery modules 110 to 130 itself may deteriorate. In addition, in power storage system 100, when a current having a value higher than the permissible current value is passed, overdischarge protection such as fuses H1 to H3 may work and the use of each of storage battery modules 110 to 130 may be interrupted.

Based on the received resistance value and permissible current value of each of storage battery modules 110 to 130, whole BMS 101 determines a maximum value of a current to be passed through inverter 300. Whole BMS 101 transmits, to vehicle control unit 400, the determined maximum value of the current to be passed through inverter 300. As described above, in power storage system 100, the maximum value of the current to be passed through inverter 300 is determined by whole BMS 101 and vehicle control unit 400 controls inverter 300 and charger 200.

Based on the received resistance value and permissible current value of each of storage battery modules 110 to 130, whole BMS 101 may determine not only the maximum value of the current to be passed through inverter 300, but also a maximum value of a current flowing from charger 200 during charging by charger 200. Vehicle control unit 400 controls charger 200 so as not to exceed the maximum value of the current flowing from charger 200 during charging.

Storage battery module 110 includes an assembled battery E1, a bus bar B1, a fuse H1, a relay Ry1, a voltage detecting unit 111, a temperature detecting unit 112, a current detecting unit 113, and a BMS 114. Assembled battery E1 is formed by connecting a plurality of single-cell batteries in series. In assembled battery E1, 80 to 100 single-cell batteries are connected in series, for example. The single-cell battery is a secondary battery. The single-cell battery may be, for example, a lithium ion secondary battery, a nickel-metal hydride secondary battery or the like.

Bus bar B1 is an electrically conductive member for connecting assembled battery E1, fuse H1 and relay Ry1 to each other. Bus bar B1 may be provided in assembled battery E1 in order to connect the plurality of single-cell batteries.

Fuse H1 prevents an overcurrent from flowing through storage battery module 110. Relay Ry1 can prevent the current from flowing through storage battery module 110. That is, when relay Ry1 is in an on state, the current flows through storage battery module 110. When relay Ry1 is in an off state, the current does not flow through storage battery module 110.

BMS 114 controls the on state or the off state of relay Ry1. BMS 114 receives a voltage value, a temperature value and a current value from voltage detecting unit 111, temperature detecting unit 112 and current detecting unit 113, respectively.

Based on the received voltage value, temperature value and current value, BMS 114 determines whether or not storage battery module 110 is in a normal state. Similarly to whole BMS 101, BMS 114 includes a CPU and the like, a memory, and a storage device such as a ROM.

When BMS 114 determines that storage battery module 110 is not in the normal state, BMS 114 controls relay Ry1 to the off state. Thus, power storage system 100 prevents the continued use of storage battery module 110 that is not in the normal state. Although FIG. 1 shows the example in which relay Ry1 is controlled by BMS 114, relay Ry1 may be controlled by whole BMS 101.

Voltage detecting unit 111 detects a voltage of assembled battery E1 and transmits the detected voltage to BMS 114. Temperature detecting unit 112 detects a temperature of assembled battery E1 and transmits the detected temperature to BMS 114. Temperature detecting unit 112 is implemented by, for example, a thermistor. Current detecting unit 113 detects a value of a current flowing through power storage system 100 and transmits the detected current value to BMS 114.

Based on the received voltage and current value, BMS 114 calculates a resistance value of assembled battery E1. The resistance value of assembled battery E1 is affected by a degree of degradation of assembled battery E1, an environmental temperature or the like. That is, the resistance value of assembled battery E1 is not always constant and may change over time.

BMS 114 calculates the resistance value using the voltage and an instantaneous value of the current, when the current value changes significantly. Alternatively, BMS 114 may calculate the resistance value every time a predetermined time period elapses. BMS 114 in the present embodiment calculates a combined resistance value as the resistance value of storage battery module 110, the combined resistance value being obtained by adding resistance values of bus bar B1, fuse H1 and relay Ry1 to the calculated resistance value of assembled battery E1. BMS 114 may calculate only the resistance value of assembled battery E1 as the resistance value of storage battery module 110, without adding the resistance values of bus bar B1, fuse H1 and relay Ry1.

In addition, BMS 114 calculates a state of charge (SOC) indicating a charging state of assembled battery E1, based on a cumulative value of a current flowing through assembled battery E1. BMS 114 includes a storage device such as a ROM. BMS 114 causes the storage device to store a time period of the passage of the current through assembled battery E1 and the cumulative value of the current flowing through assembled battery E1. BMS 114 may calculate the SOC using an open voltage.

Based on the calculated SOC of assembled battery E1 and the temperature detected by temperature detecting unit 112, BMS 114 calculates a permissible current value of assembled battery E1. BMS 114 calculates the permissible current value based on a conversion table prestored in the storage device. That is, the conversion table is configured such that a unique permissible current value is obtained using the SOC of assembled battery E1 and the temperature as input values. The conversion table may be configured such that a unique permissible current value is obtained using the current value, the voltage, the time period of the passage of the current through assembled battery E1, and the like as input values, in addition to the SOC of assembled battery E1 and the temperature.

Since storage battery modules 120 and 130 are configured similarly to storage battery module 110, description will not be repeated. "BMSs 114, 124 and 134" correspond to "resistance value calculating unit" and "current value calculating unit" according to the present disclosure. "Bus bars B1, B2 and B3", "fuses H1, H2 and H3" and "relays Ry1, Ry2 and Ry3" correspond to "electric member" according to the present disclosure.

Although FIG. 1 illustrates the example in which storage battery modules 110 to 130 include BMSs 114 to 134, respectively, power storage system 100 does not necessarily have to include BMSs 114 to 134. For example, the voltage detecting unit, the temperature detecting unit and the current detecting unit of each of storage battery modules 110 to 130 may be directly connected to whole BMS 101. This eliminates the need to place BMSs 114 to 134, which can lead to a reduction in cost. Alternatively, power storage system 100 does not necessarily have to include whole BMS 101. For example, a below-described process executed by whole BMS 101 may be executed by BMS 114. This eliminates the need to place whole BMS 101, which can lead to a reduction in cost.

Figure 2:
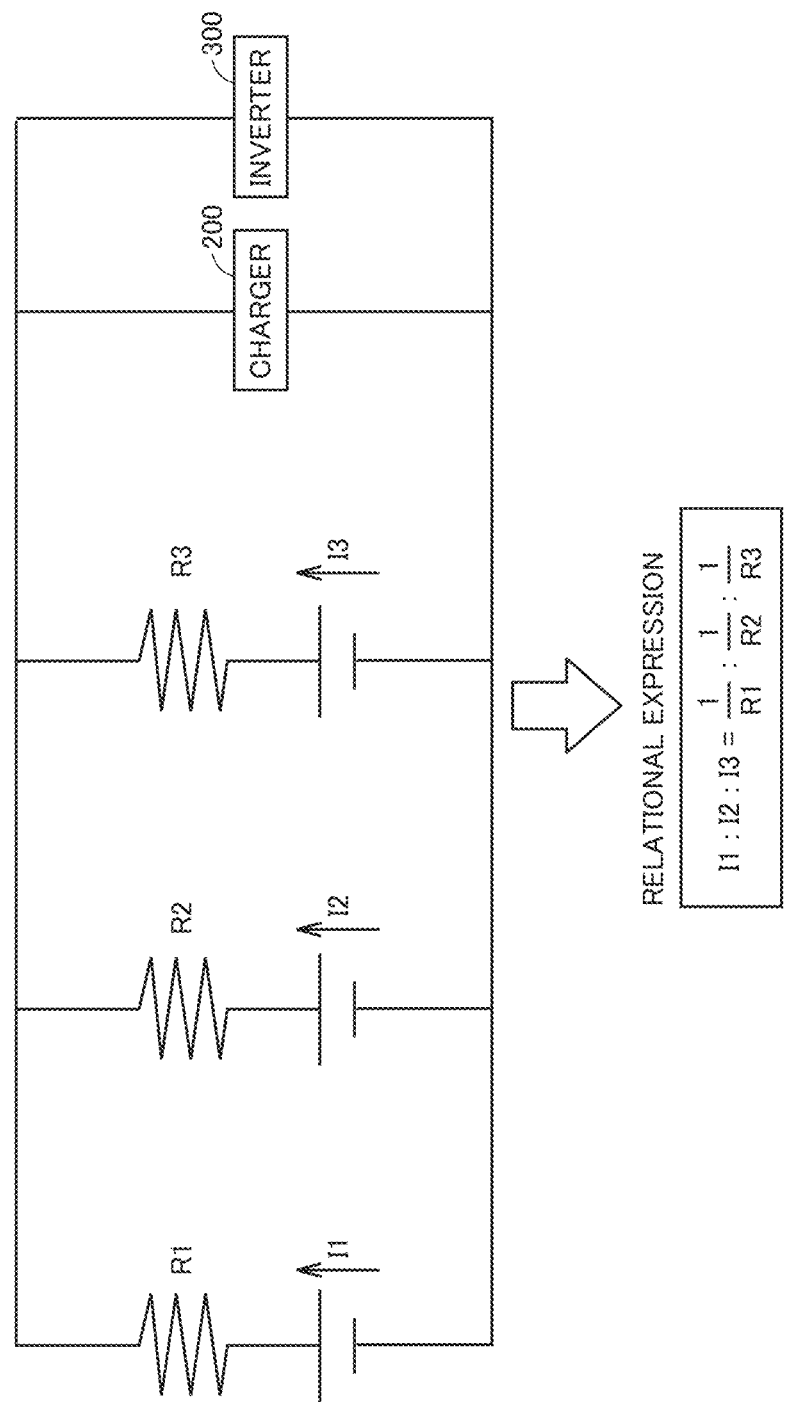
FIG. 2 is an equivalent circuit diagram of the power storage system shown in FIG. 1.

FIG. 2 is an equivalent circuit diagram of the power storage system shown in FIG. 1. A current I1 indicates a current flowing through storage battery module 110. A current I2 indicates a current flowing through storage battery module 120. A current I3 indicates a current flowing through storage battery module 130. A resistance value R1 indicates a combined resistance of storage battery module 110. A resistance value R2 indicates a combined resistance of storage battery module 120. A resistance value R3 indicates a combined resistance of storage battery module 130.

The following is a description of an example in which BMSs 114 to 134 calculate the below-described resistance values and permissible current values in power storage system 100 shown in FIG. 1. BMS 114 calculates resistance value R1 of storage battery module 110 as 100 mΩ. BMS 124 calculates resistance value R2 of storage battery module 120 as 80 mΩ. BMS 134 calculates resistance value R3 of storage battery module 130 as 60 mΩ.

In addition, in power storage system 100, BMS 114 calculates the permissible current value of storage battery module 110 as 100 A. BMS 124 calculates the permissible current value of storage battery module 120 as 120 A. BMS 134 calculates the permissible current value of storage battery module 130 as 140 A.

Since storage battery modules 110 to 130 are different from each other in degree of degradation and tolerances in a manufacturing process, resistance values R1 to R3 may be different from each other. Similarly, the permissible current values of storage battery modules 110 to 130 may be different from each other.

Since storage battery modules 110 to 130 are connected in parallel, the relational expression shown in FIG. 2 holds between currents I1 to I3 and resistance values R1 to R3. In power storage system 100 according to the present embodiment, using the relational expression shown in FIG. 2, whole BMS 101 determines a maximum value of a current to be passed through inverter 300, such that a value of a current divided into each of storage battery modules 110 to 130 does not exceed the permissible current value of each of storage battery modules 110 to 130. Thus, the current having the appropriate permissible current value is passed through the entire circuit and a situation in which the power storage system cannot exhibit the maximum capacity is prevented.

Procedure for Determining Maximum Value

The following is a description of a process procedure for determining the maximum value of the current to be passed through inverter 300 when resistance value R1 is calculated as 100 mΩ, resistance value R2 is calculated as 80 mΩ, resistance value R3 is calculated as 60 mΩ, the permissible current value of storage battery module 110 is calculated as 100 A, the permissible current value of storage battery module 120 is calculated as 120 A, and the permissible current value of storage battery module 130 is calculated as 140 A.

The permissible current value of storage battery module 110, of storage battery modules 110 to 130, is the lowest. That is, the permissible current value of 100 A is the worst value. As shown in FIGS. 1 and 2, the three storage battery modules are connected in parallel in power storage system 100. Therefore, when the worst value is simply multiplied by the number of the storage battery modules connected in parallel, the maximum value of the current to be passed through inverter 300 is 300 A. However, when whole BMS 101 controls the value of the current to be passed through the entire circuit to 300 A, power storage system 100 cannot exhibit the maximum capacity.

Figure 3:
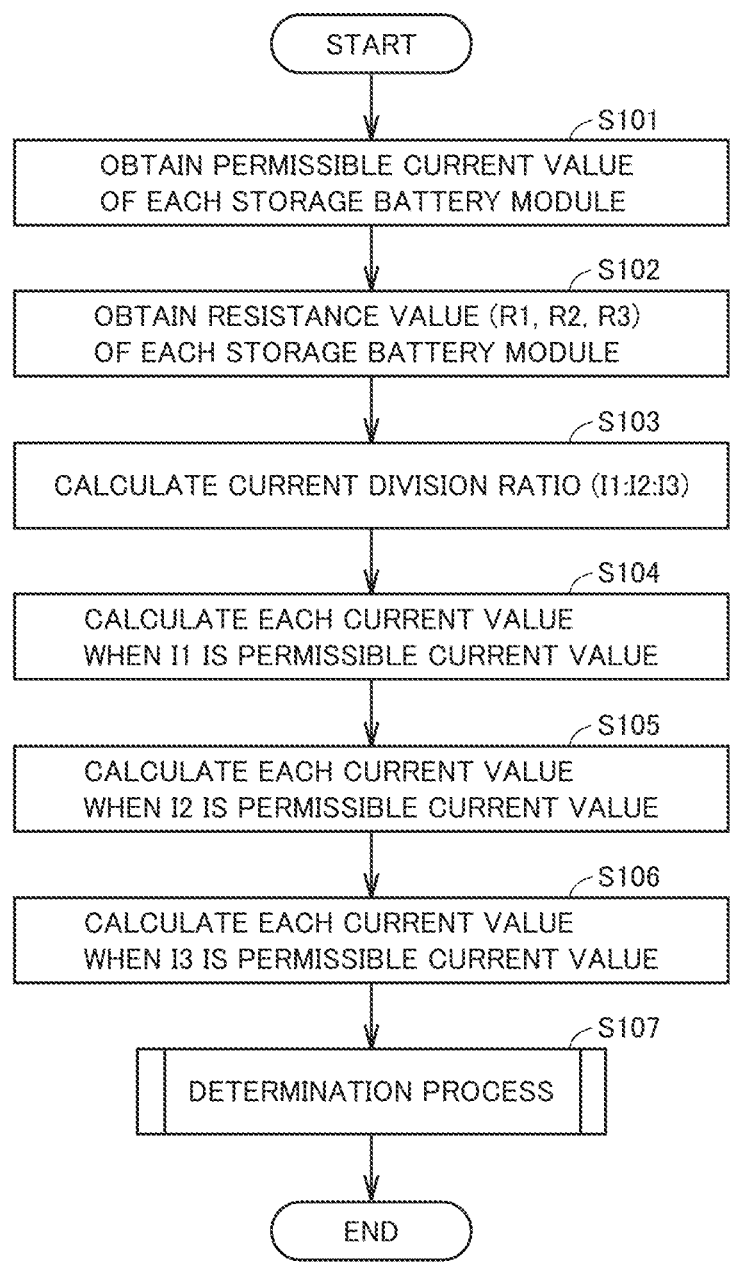
FIG. 3 is a flowchart showing a process procedure for determining a maximum value of a current to be passed through an inverter.

In power storage system 100 according to the present embodiment, the maximum value of the current to be passed through inverter 300 is determined without multiplying the worst value by the number of storage battery modules connected in parallel. FIG. 3 is a flowchart showing a process procedure for determining the maximum value of the current to be passed through inverter 300, which is executed by whole BMS 101. Whole BMS 101 executes the flowchart shown in FIG. 3 every time a predetermined time period elapses. For example, whole BMS 101 may execute the flowchart shown in FIG. 3 at intervals of 100 ms.

Whole BMS 101 obtains a permissible current value of each of storage battery modules 110 to 130 (step S101). That is, BMS 114, BMS 124 and BMS 134 calculate the permissible current values of storage battery modules 110 to 130, respectively, and transmit the calculation results to whole BMS 101. In other words, whole BMS 101 obtains the calculation results indicating that the permissible current value of storage battery module 110 is 100 A, the permissible current value of storage battery module 120 is 120 A, and the permissible current value of storage battery module 130 is 140 A.

Next, whole BMS 101 obtains resistance value R1, resistance value R2 and resistance value R3 of storage battery modules 110 to 130 (step S102). That is, BMS 114, BMS 124 and BMS 134 calculate the resistance values of storage battery modules 110 to 130, respectively, and transmit the calculation results to whole BMS 101. In other words, whole BMS 101 obtains the calculation results indicating that resistance value R1 is 100 mΩ, resistance value R2 is 80 mΩ, and resistance value R3 is 60 mΩ.

Furthermore, whole BMS 101 calculates a current division ratio based on a ratio of resistance value R1, resistance value R2 and resistance value R3 (step S103). That is, based on the relational expression shown in FIG. 2, whole BMS 101 calculates the current division ratio, which is a ratio of the values of the currents flowing through storage battery modules 110 to 130. Here, based on resistance values R1 to R3, whole BMS 101 calculates that the ratio of I1:I2:I3 is 10:12.5:16.7. Since the resistance values of storage battery modules 110 to 130 are different from each other as described above, the values of the currents flowing through storage battery modules 110 to 130 are not the same but different from each other.

Whole BMS 101 calculates a value of a current flowing through each of storage battery modules 110 to 130 when current I1 is the permissible current value of 100 A (step S104). Since the ratio of I1:I2:I3 is 10:12.5:16.7, whole BMS 101 calculates that the value of current I2 is 125 A and the value of current I3 is 167 A, assuming that the value of current I1 is 100 A. That is, the values of currents I1, I2 and I3 are 100 A, 125 A and 167 A, respectively. Whole BMS 101 causes the RAM and the like to store the calculation result in step S104 as a first calculation result.

Whole BMS 101 calculates a value of a current flowing through each of storage battery modules 110 to 130 when current I2 is the permissible current value of 120 A (step S105). Since the ratio of I1:I2:I3 is 10:12.5:16.7, whole BMS 101 calculates that the value of current I is 96 A and the value of current I3 is 160.3 A, assuming that the value of current I2 is 120 A. That is, the values of currents I1, I2 and I3 are 96 A, 120 A and 160.3 A, respectively. Whole BMS 101 causes the RAM and the like to store the calculation result in step S105 as a second calculation result.

Whole BMS 101 calculates a value of a current flowing through each of storage battery modules 110 to 130 when current I3 is the permissible current value of 140 A (step S106). Since the ratio of I1:I2:I3 is 10:12.5:16.7, whole BMS 101 calculates that the value of current I1 is 83.8 A and the value of current I2 is 104.8 A, assuming that the value of current I3 is 140 A. That is, the values of currents I1, I2 and I3 are 83.8 A, 104.8 A and 140 A, respectively. Whole BMS 101 causes the RAM and the like to store the calculation result in step S106 as a third calculation result.

Figure 4:
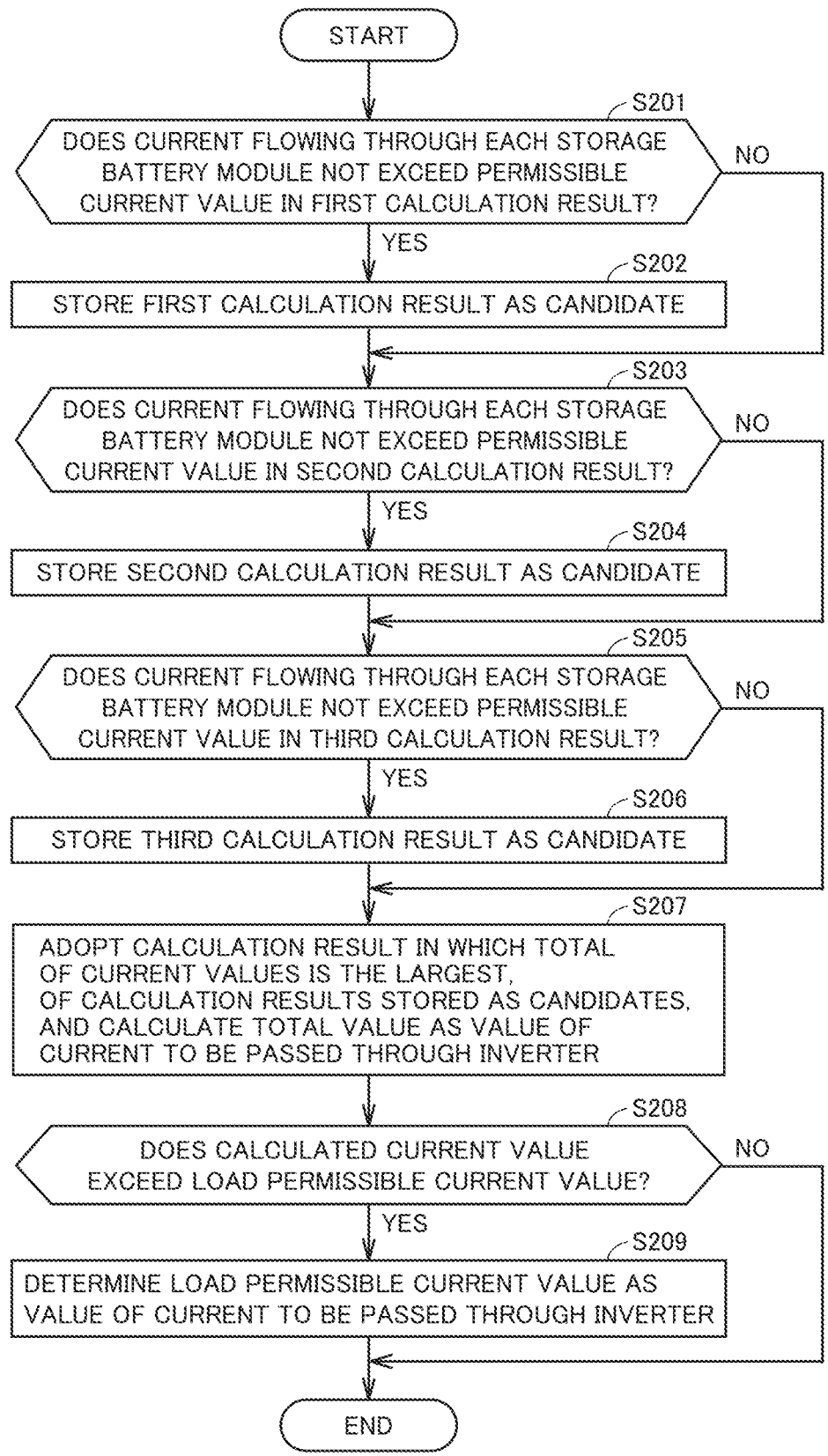
FIG. 4 is a flowchart showing the determination process in FIG. 3.

Whole BMS 101 executes the determination process for determining the value of the current to be passed through inverter 300 (step S107). FIG. 4 is a flowchart showing the determination process in FIG. 3. That is, in step S107 in FIG. 3, whole BMS 101 executes the process shown in FIG. 4. In other words, after step S106 in FIG. 3, whole BMS 101 executes step S201 in FIG. 4.

Whole BMS 101 determines whether the current flowing through each of storage battery modules 110 to 130 does not exceed the permissible current value in the first calculation result (step S201). The first calculation result is that the values of currents I1, I2 and I3 are 100 A, 125 A and 167 A, respectively. Current I2 and current I3 exceed the permissible current value. Therefore, whole BMS 101 determines that the currents exceed the permissible current value in the first calculation result (NO in step S201), and the process proceeds to step S203.

When whole BMS 101 determines that the current flowing through each of storage battery modules 110 to 130 does not exceed the permissible current value in the first calculation result (YES in step S201), whole BMS 101 causes the RAM and the like to store the first calculation result as a candidate (step S202).

Next, whole BMS 101 determines whether the current flowing through each of storage battery modules 110 to 130 does not exceed the permissible current value in the second calculation result (step S203). The second calculation result is that the values of currents I1, I2 and I3 are 96 A, 120 A and 160.3 A, respectively. Current I3 exceeds the permissible current value. Therefore, whole BMS 101 determines that the current exceeds the permissible current value in the second calculation result (NO in step S203), and the process proceeds to step S204. When whole BMS 101 determines that the current flowing through each of storage battery modules 110 to 130 does not exceed the permissible current value in the second calculation result (YES in step S203), whole BMS 101 causes the RAM and the like to store the second calculation result as a candidate (step S204).

Furthermore, whole BMS 101 determines whether the current flowing through each of storage battery modules 110 to 130 does not exceed the permissible current value in the third calculation result (step S205). The third calculation result is that the values of currents I1, I2 and I3 are 83.8 A, 104.8 A and 140 A, respectively. All of current I1, current I2 and current I3 do not exceed the permissible current value. Therefore, whole BMS 101 determines that the currents do not exceed the permissible current value in the third calculation result (YES in step S205), and causes the RAM and the like to store the third calculation result as a candidate (step S206).

Whole BMS 101 adopts the calculation result in which a total of the current values is the largest, of the calculation results stored as the candidates, and determines the total value as the value of the current to be passed through inverter 300 (step S207).

Since only the third calculation result is stored as the candidate, whole BMS 101 calculates a total of the values of currents I1, I2 and I3 in the third calculation result. Since the third calculation result is that the values of currents I1, I2 and I3 are 83.8 A, 104.8 A and 140 A, respectively, the total value is 328.6 A. As described above, in power storage system 100 according to the present embodiment, it is possible to supply the current of 328.6 A to inverter 300, while preventing the value of the current flowing through each of storage battery modules 110 to 130 from exceeding the permissible current value. Therefore, in power storage system 100, the current supplied to inverter 300 can be increased by 28.6 A, as compared with 300 A, which is a value obtained simply by multiplying the worst value by the number of storage battery modules.

When a plurality of candidates are stored in the RAM and the like, whole BMS 101 calculates, as the value of the current to be passed through inverter 300, the calculation result in which a total of the values of currents I1, I2 and I3 is the largest, of the plurality of candidates.

Lastly, using the ratio of resistance values R1 to R3, whole BMS 101 determines whether or not the calculated value of the current to be passed through inverter 300 exceeds a load permissible current value (step S208). The load permissible current value refers to a value of a current predetermined on the inverter 300 side, and a value of a current permitted to be passed through inverter 300. When the value of the current to be passed through inverter 300, which is calculated in step S207, does not exceed the load permissible current value (NO in step S208), whole BMS 101 executes control such that the current having the value calculated in step S207 is passed through inverter 300, and the process ends.

When the value of the current to be passed through inverter 300, which is calculated in step S207, exceeds the load permissible current value (YES in step S208), whole BMS 101 executes control such that the load permissible current value is passed through inverter 300, and the process ends. Thus, in power storage system 100, it is possible to prevent the value of the current to be passed through inverter 300 from exceeding the predetermined load permissible current value.

Since the permissible current values and the resistance values of storage battery modules 110 to 130 change from moment to moment depending on a state of the batteries, whole BMS 101 and BMS 114, BMS 124 and BMS 134 repeat the above-described computation and determination process at predetermined time intervals, e.g., at intervals of 100 ms. The permissible current values and the resistance values of the storage battery modules during charging, and the permissible current values and the resistance values of the storage battery modules during discharging may be computed separately. For example, the permissible current during charging and the permissible current during discharging change in accordance with an amount of charging of the storage battery module. Specifically, when the amount of charging is large, the permissible current during charging is set small and the permissible current during discharging is set large. Whole BMS 101 computes and determines the permissible current during charging based on a permissible current during charging and a resistance during charging obtained from each BMS, and computes and determines the permissible current during discharging based on a permissible current during discharging and a resistance during discharging obtained from each BMS.

SUMMARY

The present disclosure is directed to power storage system 100 including a plurality of storage battery modules 110, 120 and 130 connected in parallel with inverter 300. Power storage system 100 includes: BMS 114, BMS 124 and BMS 134 that calculate resistance values of the plurality of storage battery modules and calculate permissible current values of the plurality of storage battery modules; and whole BMS 101 that determines a maximum value of a current to be passed through inverter 300, based on the permissible current values. Whole BMS 101 determines the maximum value such that a value of a current divided into each storage battery module of the plurality of storage battery modules 110, 120 and 130 does not exceed the permissible current value of each storage battery module of the plurality of storage battery modules 110, 120 and 130 based on a ratio of resistance values R1, R2 and R3 obtained by BMS 114, BMS 124 and BMS 134.

Thus, in power storage system 100, the current having the appropriate permissible current value is passed through the entire circuit, and power storage system 100 prevents a situation in which power storage system 100 cannot exhibit the maximum capacity, while preventing the value of the current flowing through each of storage battery modules 110 to 130 from exceeding the permissible current value.

Although the embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A power storage system including a plurality of storage battery modules connected in parallel with a load, the power storage system comprising:
    a processor configured to
        calculate a resistance value of each storage battery module of the plurality of storage battery modules;
        calculate a permissible current value of each storage battery module of the plurality of storage battery modules;
        based on a ratio of the resistance value of each storage battery module of the plurality of storage battery modules, calculate a plurality of calculation results respectively indicating, for the permissible current value of each storage battery module of the plurality of storage battery modules, a value of a current divided into each storage battery module of the plurality of storage battery modules, and
        determine, as a maximum value of a current to be passed through the load, a calculation result, among the plurality of calculation results, having a largest total current value without exceeding the permissible current value of each storage battery module of the plurality of storage battery modules, wherein
    the processor is configured to
        calculate the resistance value of each storage battery module every time a predetermined period elapses, and
        in response to a significant change of a current value of the current, calculate the resistance value of each storage battery module using a voltage and an instantaneous value of the current at a time of the significant change.

2. The power storage system according to claim 1, wherein
    each storage battery module of the plurality of storage battery modules includes
        an assembled battery, and
        an electric member for arranging the assembled battery in an electric circuit, and
    the processor is configured to calculate the resistance value of said each storage battery module based on an internal resistance of the assembled battery and a resistance of the electric member.

3. The power storage system according to claim 1, wherein
    the processor is configured to calculate the permissible current value of each storage battery module of the plurality of storage battery modules based on a state of charge (SOC), the SOC indicating a charging state of said each storage battery module.

4. The power storage system according to claim 1, wherein the processor is configured to calculate the permissible current value of each storage battery module of the plurality of storage battery modules based on a temperature of said each storage battery module.

5. The power storage system according to claim 1, wherein
the processor is configured to determine the maximum value so as not to exceed a load permissible current value, the load permissible current value being a value of a current permitted to be passed through the load.

6. A controller for a power storage system including a plurality of storage battery modules connected in parallel with a load, the controller comprising:
a processor configured to
obtain a resistance value of each storage battery module of the plurality of storage battery modules and a permissible current value of each storage battery module of the plurality of storage battery modules;
based on a ratio of the resistance value of each storage battery module of the plurality of storage battery modules, calculate a plurality of calculation results respectively indicating, for the permissible current value of each storage battery module of the plurality of storage battery modules, a value of a current divided into each storage battery module of the plurality of storage battery modules; and
determine, as a maximum value of a current to be passed through the load, a calculation result, among the plurality of calculation results, having a largest total current value without exceeding the permissible current value of each storage battery module of the plurality of storage battery modules, wherein
the processor is configured to
calculate the resistance value of each storage battery module every time a predetermined period elapses, and
in response to a significant change of a current value of the current, calculate the resistance value of each storage battery module using a voltage and an instantaneous value of the current at a time of the significant change.

* * * * *